United States Patent
Bisheh Niasar et al.

(10) Patent No.: US 12,500,736 B2
(45) Date of Patent: Dec. 16, 2025

(54) MONTGOMERY MULTIPLIER ARCHITECTURE

(71) Applicant: Microsoft Technology Licensing, LLC, Redmond, WA (US)

(72) Inventors: Mojtaba Bisheh Niasar, Ithaca, NY (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 18/373,111

(22) Filed: Sep. 26, 2023

(65) Prior Publication Data
US 2025/0062890 A1    Feb. 20, 2025

Related U.S. Application Data (60) Provisional application No. 63/532,497, filed on Aug. 14, 2023.

(51) Int. Cl.
*H04L 9/06*    (2006.01)
*G06F 7/72*    (2006.01)

(52) U.S. Cl.
CPC .............. *H04L 9/06* (2013.01); *G06F 7/722* (2013.01)

(58) Field of Classification Search
CPC ............ H04L 9/06; G06F 7/722; G06F 7/728
See application file for complete search history.

(56) References Cited

U.S. PATENT DOCUMENTS

| | | | | |
|---|---|---|---|---|
| 6,625,631 B2* | 9/2003 | Ruehle | ............... | G06F 7/728 708/491 |
| 7,046,800 B1* | 5/2006 | Tenca | ............... | G06F 7/728 380/28 |
| 7,050,579 B1* | 5/2006 | Koc | ............... | G06F 7/721 708/135 |
| 7,174,015 B1* | 2/2007 | Koc | ............... | G06F 7/728 380/28 |
| 7,403,965 B2* | 7/2008 | Mukaida | ............... | G06F 7/728 708/492 |

(Continued)

OTHER PUBLICATIONS

Zhang et al.; "High-Radix Design of a Scalable Montgomery Modular Multiplier With Low Latency", 2022, IEEE Transactions On Computers, vol. 71, No. 2, pp. 436-449. (Year: 2022).*

(Continued)

*Primary Examiner* — Matthew Smithers
(74) *Attorney, Agent, or Firm* — Schwegman Lundberg & Woessner, P.A.

(57) ABSTRACT

Montgomery multiplier architectures are provided. A circuit can include an initial processing element (PE) circuit configured to generate a first output including (i) a radix of a carry out and (ii) a radix of an intermediate result based on radixes of respective operands, a radix of an inverse of a modulus, and a radix of the modulus, middle PE circuits configured to generate a second output including (i) respective radixes of a Montgomery multiplication result and (ii) further respective radixes of a carry out on two consecutive clock cycles based on the first output, and a final PE circuit configured to generate further radixes of the Montgomery multiplication results on two consecutive, subsequent clock cycles based on the second output.

19 Claims, 7 Drawing Sheets

(56) References Cited

U.S. PATENT DOCUMENTS

| | | | | |
|---|---|---|---|---|
| 8,117,251 B2* | 2/2012 | Bertoni | ............... | G06F 7/728 |
| | | | | 708/203 |
| 8,527,570 B1* | 9/2013 | Shu | ............... | G06F 7/728 |
| | | | | 708/491 |
| 10,101,969 B1* | 10/2018 | Ruan | ............... | G06F 7/722 |
| 11,210,067 B1* | 12/2021 | Koziel | ............... | G06F 7/728 |
| 2003/0140077 A1* | 7/2003 | Zaboronski | ............... | G06F 7/723 |
| | | | | 708/491 |
| 2004/0125948 A1* | 7/2004 | Son | ............... | G06F 7/728 |
| | | | | 380/28 |
| 2004/0167952 A1* | 8/2004 | Gueron | ............... | G06F 7/728 |
| | | | | 708/492 |
| 2004/0179681 A1* | 9/2004 | Lee | ............... | G06F 7/728 |
| | | | | 380/30 |
| 2004/0252829 A1* | 12/2004 | Son | ............... | G06F 7/5443 |
| | | | | 708/491 |
| 2005/0165875 A1* | 7/2005 | Mukaida | ............... | G06F 7/728 |
| | | | | 708/492 |
| 2005/0198093 A1* | 9/2005 | Son | ............... | G06F 7/728 |
| | | | | 708/625 |
| 2006/0059221 A1* | 3/2006 | Carlson | ............... | G06F 9/30065 |
| | | | | 708/620 |
| 2007/0260664 A1* | 11/2007 | Bertoni | ............... | G06F 7/722 |
| | | | | 708/490 |
| 2008/0065714 A1* | 3/2008 | Fishcher | ............... | G06F 7/722 |
| | | | | 708/620 |
| 2009/0003595 A1* | 1/2009 | Ozturk | ............... | G06F 7/72 |
| | | | | 708/491 |
| 2009/0037508 A1* | 2/2009 | Bernard | ............... | G06F 7/5443 |
| | | | | 708/521 |
| 2011/0231467 A1* | 9/2011 | Ahn | ............... | G06F 7/728 |
| | | | | 708/490 |
| 2022/0269488 A1* | 8/2022 | Zevulun | ............... | G06F 7/728 |
| 2023/0185537 A1* | 6/2023 | Zhang | ............... | G06F 7/728 |
| | | | | 708/491 |

OTHER PUBLICATIONS

Kamala et al.; "High-Throughput Montgomery Modular Multiplication", 2006, IFIP, pp. 58-62. (Year: 2006).*

Harris et al,; "An Improved Unified Scalable Radix-2 Montgomery Multiplier", 2005, Proceedings of the 17th IEEE Symposium on Computer Arithmetic, pp. 1-7. (Year: 2005).*

McIvor et al.; "High-Radix Systolic Modular Multiplication on Reconfigurable Hardware", 2005, IEEE, pp. 13-18. (Year: 2005).*

International Search Report and Written Opinion received for PCT Application No. PCT/US2024/038435, Nov. 4, 2024, 12 pages.

Mcivor, et al., "High-radix systolic modular multiplication on reconfigurable hardware", Proceeding IEEE International Conference on Field-Programmable Technology, Dec. 11, 2005, pp. 13-18.

* cited by examiner

MONTGOMERY MULTIPLIER ARCHITECTURE

RELATED APPLICATION

This application claims the benefit of priority to U.S. Provisional Patent Application No. 63/532,497 titled "Montgomery Multiplier Architecture" and filed on Aug. 14, 2023, which is incorporated herein by reference in its entirety.

BACKGROUND

Modular multiplication is a common operation in many algorithms. For example, modular multiplication is common in number theory and cryptography, such as Rivest, Shamir, Adleman (RSA), Diffie-Hellman key exchange, and elliptic curve cryptography (ECC). These algorithms include operations modulo a large odd number. The operations modulo the large odd number are slow to compute with the typical algorithms. This is, at least in part, because the operations require expensive division operations. The classical modular multiplication iteratively divides by the modulus to determine a remainder.

An improvement to the classical technique includes the Barrett reduction technique. The Barrett reduction technique approximates the inverse of the modulus (e.g., 1/modulus) as a ratio of an integer and division by $2^k$ (e.g., $m/2^k$). This is beneficial because division by $2^k$ is easily implemented by shifting k bits, which is computationally efficient. In Barret's technique, m is multiplied by the initial number (e.g., a) and then bit-shifted k times.

A Montgomery multiplier is another method of modular multiplication that does not use division. Montgomery multiplication provides a method for performing fast modular multiplication without division. A "Montgomery multiplier", a multiplier that performs modular multiplication using the Montgomery technique, uses a special representation of numbers, called Montgomery form, and adds multiples of a modulus to cancel out lower bits of a product.

A Montgomery multiplier has several advantages over conventional or Barrett reduction algorithms, such as faster speed, lower memory requirements, and simpler hardware design. The Montgomery multiplier improves the performance and security of many applications that rely on modular arithmetic. A Montgomery multiplier can be implemented efficiently on application specific integrated circuit (ASIC)/field programmable gate array (FPGA) platforms which are capable of performing fast arithmetic modulo an integer that is a power of 2.

SUMMARY

Embodiments regard circuits, devices, and methods for Montgomery multiplication. The circuits, devices, and methods are configurable to efficiently compute a Montgomery multiplication for a wide variety of input sizes and wide variety of Montgomery multiplication parameters. The circuits, devices, and methods are computationally efficient, taking fewer computation cycles than prior Montgomery multiplier techniques.

A Montgomery multiplier circuit can include an initial processing element (PE) circuit configured to, based on inputs from a cryptosystem, generate a first output. The first output can include (i) a radix of a carry out and (ii) a radix of an intermediate result. The inputs from the cryptosystem can include a radix of a first operand, a radix of a second operand, a radix of an inverse of a modulus, and a radix of the modulus. The Montgomery multiplier circuit can include middle PE circuits configured to generate, based on the first output, a second output. The second output can include (i) respective radixes of a first portion of a Montgomery multiplication result and (ii) further respective radixes of a carry out on two consecutive clock cycles. The Montgomery multiplier circuit can include a final PE circuit configured to generate, based on the second output, further radixes of a second portion of the Montgomery multiplication result on two consecutive, subsequent clock cycles.

The middle PE circuits can further operate based on further radixes of the operands. The middle PE circuits can be connected in series with each other and the initial PE circuit to operate on output of an immediately prior PE circuit and provide output to the final PE circuit.

The initial PE circuit can operate every other clock cycle. The middle and final PE circuits can operate every clock cycle.

The initial PE circuit can include a first multiplier configured to receive the radixes of the respective operands and generate a first product thereof. The initial PE circuit can include a first adder configured to receive least significant bits (LSBs) of the product and a Montgomery multiplier result from a middle PE circuit of the middle PE circuits and determine a first sum thereof. The initial PE circuit can include a second adder configured to receive a most significant bit (MSB) of the sum and MSBs of the product and generate a second sum thereof. The initial PE circuit can include a second multiplier configured to receive the radix of the inverse of the modulus and the second sum and generate the intermediate result that is a second product thereof. The initial PE circuit can includes a first flip flop configured to receive LSBs of the first sum. The initial PE circuit can include a second flip flop configured to receive the second sum. The initial PE circuit can include a third flip flop configured to receive the intermediate result. The initial PE circuit can include a third multiplier configured to receive output of the third flip flop and the radix of the modulus and generate a third product thereof. The initial PE circuit can include a third adder configured to receive LSBs of the third product and output of the first flip flop and generate a third sum thereof. The initial PE circuit can include a fourth adder configured to receive MSBs of the third product, output of the second flip flop, and an MSB of the third product and generate the radix of the carry out that is a sum thereof.

Each of the middle PE circuits can include a fourth multiplier configured to receive the radixes of the respective operands and determine a fourth product thereof. Each of the middle PE circuits can include a fifth multiplier configured to receive the intermediate output and a radix of the modulus and generate a fifth product thereof. Each of the middle PE circuits can include a fifth adder configured to receive the fourth product, the fifth product, the carry out from an immediately previous middle PE circuit of the middle PE circuits or the initial PE circuit, and a Montgomery multiplication result from a downstream middle PE circuit of the middle PE circuits or the final PE circuit and generate a fifth sum thereof. Each of the middle PE circuits can include a fourth flip flop configured to receive LSBs of the fifth sum, the LSBs of the fifth sum corresponding to a radix of the result of Montgomery multiplication. Each of the middle PE circuits can include a fifth flip flop configured to receive MSBs of the fifth sum, the MSBs of the fifth sum corresponding to a middle carry out of the middle PE circuit. Each of the middle PE circuits can include a first multiplexer configured to receive the carry out and the middle carry out from the fifth flip flop as respective inputs. Each of the middle PE circuits can include a second multiplexer configured to receive the Montgomery multiplication result from the downstream middle PE circuit of the middle PE circuits or the final PE circuit and the LSBs of the fifth sum from the fourth flip flop as respective inputs.

The final PE circuit can include a sixth multiplier configured to receive the radixes of the respective operands and determine a sixth product thereof. The final PE circuit can include a seventh multiplier configured to receive the intermediate output and a radix of the modulus and generate a seventh product thereof. The final PE circuit can include a sixth adder configured to receive the sixth product, the seventh product, the carry out from a last middle PE circuit of the middle PE circuits, and a radix of the result of the Montgomery multiplication from the final PE circuit and generate a sixth sum thereof. The final PE circuit can include a sixth flip flop configured to receive LSBs of the sixth sum, the LSBs of the sixth sum corresponding to a radix of the result of the Montgomery multiplication. The final PE circuit can include a seventh flip flop configured to receive MSBs of the sixth sum, the MSBs of the sixth sum corresponding to a final carry out of the final PE circuit. The final PE circuit can include a third multiplexer coupled to the sixth adder, the third multiplexer configured to receive the final carry out and the carry out from a last middle PE circuit of the middle PE circuits as respective inputs. The final PE circuit can include a fourth multiplexer configured to receive the radix of the result of the Montgomery multiplication from the fifth flip flop and the LSBs of the sixth sum from the sixth flip flop as respective inputs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Scalable hardware implementations of a Montgomery multiplier are provided. The Montgomery multiplier can be configured to work with different parameters (e.g., field size, modulo value, radix, or the like). The scalable Montgomery multipliers provide a tradeoff between utilization and performance to implement an efficient Montgomery multiplier from different optimization perspectives.

As discussed in the Background, a Montgomery multiplier performs modular multiplication in a computationally efficient manner (efficient in terms of number of operations used to compute the result of a modular multiplication). The Montgomery multiplier was introduced in 1985 by Peter L Montgomery and is often used in number theory and cryptography.

The Montgomery multiplier relies on a special representation of numbers called "Montgomery form". Montgomery form depends on a constant R that is coprime to the modulus N. The Montgomery form of a number x is x*R mod N. The advantage of this representation is that it allows computing the product of two numbers in Montgomery form without any expensive division operations. Instead, it uses a technique called Montgomery reduction, which adds multiples of N to cancel out the lower bits and then discards them by dividing by R. The division by R can be done efficiently by bit shifting when R is chosen to be a power of two.

The Montgomery multiplier is useful for, among other things, algorithms that require multiple modular multiplications in a row, such as modular exponentiation, which is the basis of many cryptosystems such as RSA and Diffie-Hellman key exchange. The inputs to the Montgomery multiplier come from the application, algorithm, or hardware that operates using Montgomery multiplication. By using the Montgomery multiplier, these algorithms can avoid converting the numbers into and out of Montgomery form for each multiplication, and only do it twice, once at the beginning and once at the end. This can significantly improve the speed and performance of the algorithms.

The Montgomery multipliers provide a new approach for implementing a Montgomery multiplier on an ASIC/FPGA. The Montgomery multipliers include a configurable architecture including several processing elements (PE). The PEs can include a single, initial PE, multiple middle PEs, and a single final PE. Each of the middle PEs can have a same architecture. The initial PE can be coupled in series to a first PE of the middle PEs. The remaining middle PEs can be connected in series with the first PE and to each other, in order. The final PE can be connected in series to a last of the middle PEs.

Montgomery multiplier architectures provided can include:

A configurable hardware architecture that can be used for different N (modulus) values.

A scalable hardware architecture that can be configured for different radix. A radix is a size of a chunk of data that is processed in a given iteration of processing. The scalable hardware architecture gives a user the ability to tradeoff between resource utilization and performance based on application requirements.

An improvement in the performance of modular multiplication in terms of compute time.

The Montgomery multiplier algorithm is based on (i) integrating multiplication and reduction steps and (ii) scanning the operands word by word.

The Montgomery multiplier algorithm is defined as follows:

Given two, k-bit integers, A and B, and a modulus, N, such that a constraint of a greatest common divisor (gcd) of (N, 2^k)=1 is true, compute MontMult (A, B)=A*B*2^-k mod N. Pseudocode for the Montgomery multiplier algorithm is provided:

1. Initialize T = 0.
2. For i = 0 to k - 1:
   o Compute q = (T + A[i] * B[0]) * N'[0] mod 2, where N' is the modular inverse of N mod 2^k. N'[0] is called μ elsewhere herein.
   o Compute T = (T + A[i] * B + q * N) / 2.
3. If T >= N, then return T - N; else, return T.

The improved Montgomery multiplier architectures improve Montgomery multiplication computation time by parallelizing the multiplication and reduction steps. The Montgomery multiplier architectures can include three types of PEs as discussed previously. Each of the PEs is described in turn, followed by a discussion of a system that includes all three PEs.

Figure 1:
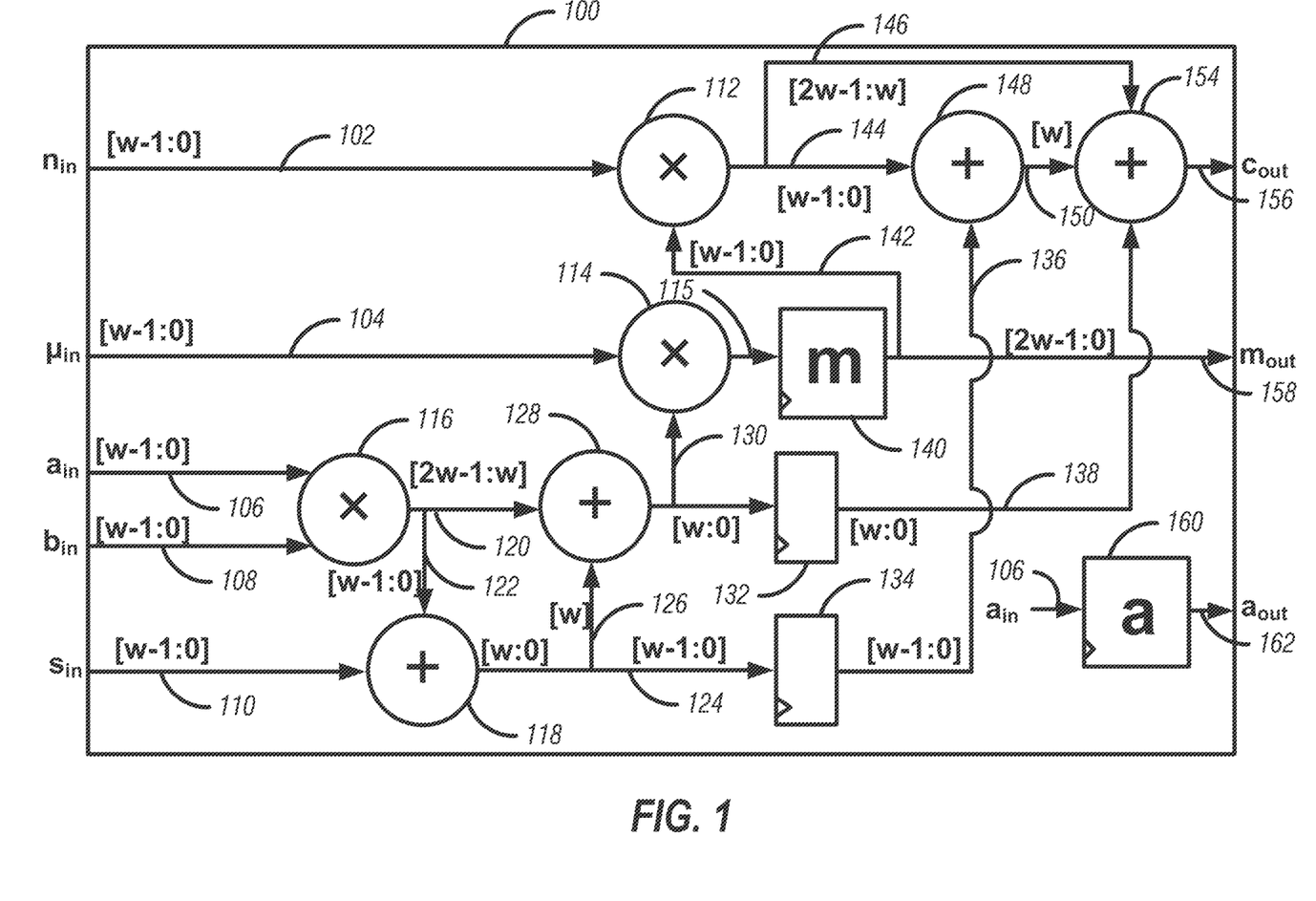
FIG. 1 illustrates, by way of example, a diagram of an embodiment of an initial PE.

FIG. 1 illustrates, by way of example, a diagram of an embodiment of an initial PE 100. The initial PE 100 as illustrated includes inputs $n_{in}$ 102, $\mu_{in}$ 104, $a_{in}$ 106, $b_{in}$ 108, and $s_{in}$ 110. In the example of FIG. 1 each radix has w bits, where w is an integer. $n_{in}$ 102 is a radix of N, $\mu_{in}$ 104 is a radix of the modular inverse of N, $a_{in}$ 106 is a radix of integer A, $b_{in}$ 108 is a radix of integer B, and $s_{in}$ 110 is a radix of S, which is a result of Montgomery multiplication. The initial PE 100 includes circuitry (e.g., multipliers 112, 114, 116 (not modular, but standard multipliers), adders 118, 128, 148 (not modular, but standard adders), and flip flops 132, 134, 140, 160, as well as electrical interconnects therebetween). The circuitry operates on the inputs $n_{in}$ 102, $\mu_{in}$ 104, $a_{in}$ 106, $b_{in}$ 108, and $s_{in}$ 110, to generate outputs $c_{out}$ 156, $m_{out}$ 158, $a_{out}$ 162. $c_{out}$ 156 is a carry (the most significant bits (MSBs) of the output that is relevant to determining a next most significant radix of the output. $a_{out}$ 162 is a replication of $a_{in}$ 106 delayed by a clock cycle. $m_{out}$ 158 is an intermediate result determined based on $\mu_{in}$ 104, $a_{in}$ 106, $b_{in}$ 108, and $s_{in}$ 110.

In a first clock cycle of the initial PE 100, the multiplier 116 produces a result. The result is split into MSBs 120 and LSBs 122. The result is a product of $a_{in}$ 106 and $b_{in}$ 108. The adder 118 produces a sum of $s_{in}$ 110 and the LSBs 122 of the product from the multiplier 116. The sum is split into an MSB 126 and LSBs 124. The LSBs 124 of the sum from the adder 118 are stored in the flip flop 134.

The adder 128 adds the MSB 126 of the sum from the adder 118 to the MSBs 120 of the product from the multiplier 116 to produce sum 130. The sum 130 is stored in the flip flop 132 and provided by flip flop 132 on a subsequent clock cycle as output 138. The flip flop 160 stores $a_{in}$ 106.

During a next clock cycle, the multiplier 114 produces a product 115 of $\mu_{in}$ 104 and the sum 130. The product 115 is stored in the flip flop 140. The multiplier 112 generates a product of LSBs 142 of the product 115 and $n_{in}$ 102. The product is split into MSBs 146 and LSBs 144. The adder 148 determines a sum of LSBs 136 and the LSBs 144. Note the LSBs 136 in this next clock cycle equal the LSBs 124 stored in the flip flop 134 from the immediately previous clock cycle. The adder 154 determines a sum, $c_{out}$ 156, of an MSB 150 of the sum from the adder 148 and the MSBs 146 of the product from the multiplier 112. $m_{out}$ 158 is provided by the flip flop 140. $a_{out}$ 162 is provided by the flip flop 160.

Figure 2:
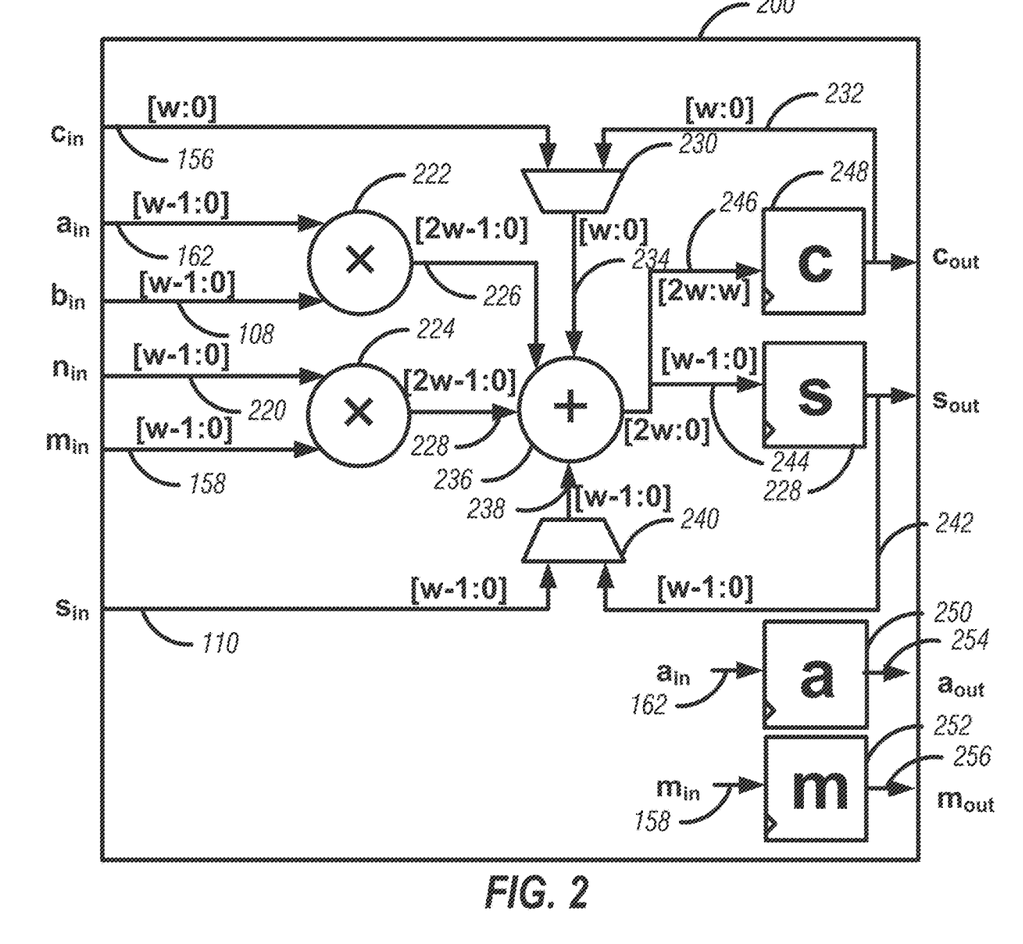
FIG. 2 illustrates, by way of example, a circuit diagram of an embodiment of a middle PE.

FIG. 2 illustrates, by way of example, a circuit diagram of an embodiment of a middle PE 200. The middle PE 200 as illustrated receives $c_{in}$ 156, $a_{in}$ 162, $b_{in}$ 108, $n_{in}$ 220, $m_{in}$ 158, and $s_{in}$ 110. $c_{in}$ 156, $m_{in}$ 158, and $a_{in}$ 162 for the middle PE 200 are equal to $c_{out}$ 156, $m_{out}$ 158, and $a_{out}$ 162 from the initial PE 100 or an immediately previous middle PE in a chain of middle PEs. Thus the outputs and inputs that are equal to each other are illustrated as having the same reference number. The inputs to the middle PE 200 are results from the initial PE 100, equal to inputs to the initial PE 100, or are results from an immediately previous middle PE 200 in a series of middle PEs, or a combination thereof. Thus, operation of the middle PE 200 is not relevant until the inputs to the middle PE 200 are valid. This means that at least two clock cycles pass before operation of the middle PE 200 is valid. Outputs of the middle PE 200 for clock cycles before the inputs are valid can be discarded.

The middle PE 200 as illustrated includes inputs $c_{in}$ 156, $m_{in}$ 158, $a_{in}$ 162, $b_{in}$ 108, $n_{in}$ 220, and $s_{in}$ 110. In the example of FIG. 2 each radix has w bits, where w is an integer. The middle PE 200 includes circuitry (e.g., multipliers 222, 224 (not modular, but standard multipliers), adder 236 (not modular, but a standard adder), multiplexers 230, 240, and flip flops 228, 248, 250, 252, as well as electrical interconnects therebetween). The circuitry operates on the inputs $c_{in}$ 156, $m_{in}$ 158, $a_{in}$ 162, $b_{in}$ 108, $n_{in}$ 220, and $s_{in}$ 110, to generate outputs $c_{out}$ 232, $s_{out}$ 242, $m_{out}$ 256, $a_{out}$ 254. $c_{out}$ 232 is a carry (the most significant bits (MSBs)) of the output that is relevant to determining a next most significant radix of the output. $a_{out}$ 254 is a replication of $a_{in}$ 162 delayed by a clock cycle. $m_{out}$ 256 is a replication of $m_{in}$ 158 delayed by a clock cycle. $s_{out}$ 242 is a result of Montgomery multiplication.

In a first valid clock cycle of the middle PE 200, the multiplier 222 produces a result 226 that is a product of $a_{in}$ 162 and $b_{in}$ 108. The multiplier 224 produces a result 228 that is a product of $m_{in}$ 158 and $n_{in}$ 220. The results 226, 228 are summed with $c_{in}$ 156 and $s_{in}$ 110 by adder 236 to produce a result. The result is split into MSBs 246 and LSBs 244. $a_{in}$ 162 is propagated to the input of the flip flop 250. $m_{in}$ 158 is propagated to the input of the flip flop 252. The MSBs 246 are propagated to the input of the flip flop 248. The LSBs 244 are propagated to the input of the flip flop 228.

In an immediately next valid clock cycle of the middle PE 200, the multiplier 222 produces a result 226 that is a product of $a_{in}$ 162 and $b_{in}$ 108. The multiplier 224 produces a result 228 that is a product of $m_{in}$ 158 and $n_{in}$ 220. The multiplexer 230 is controlled to provide $c_{out}$ 232 on its output 234. The multiplexer 240 is controlled to provide $s_{out}$ 242 on its output 238. The results 226, 228 are summed with $c_{out}$ 232 and $s_{out}$ 242 by adder 236 to produce a result. The result is split into MSBs 246 and LSBs 244. $a_{in}$ 162 is propagated to the output of the flip flop 250. $m_{in}$ 158 is propagated to the output of the flip flop 252. The MSBs 246 are propagated to the input of the flip flop 248. The LSBs 244 are propagated to the input of the flip flop 228. $s_{out}$ 242 from each of the initial valid clock cycles of the middle PE 200 are recorded as Montgomery outputs.

Typically, multiple middle PEs 200 are chained together in series to generate Montgomery multiplier results. Then the results from the last middle PE 200 in the chain of the middle PEs 200 are provided to a final PE 300 (see FIG. 3).

Figure 3:
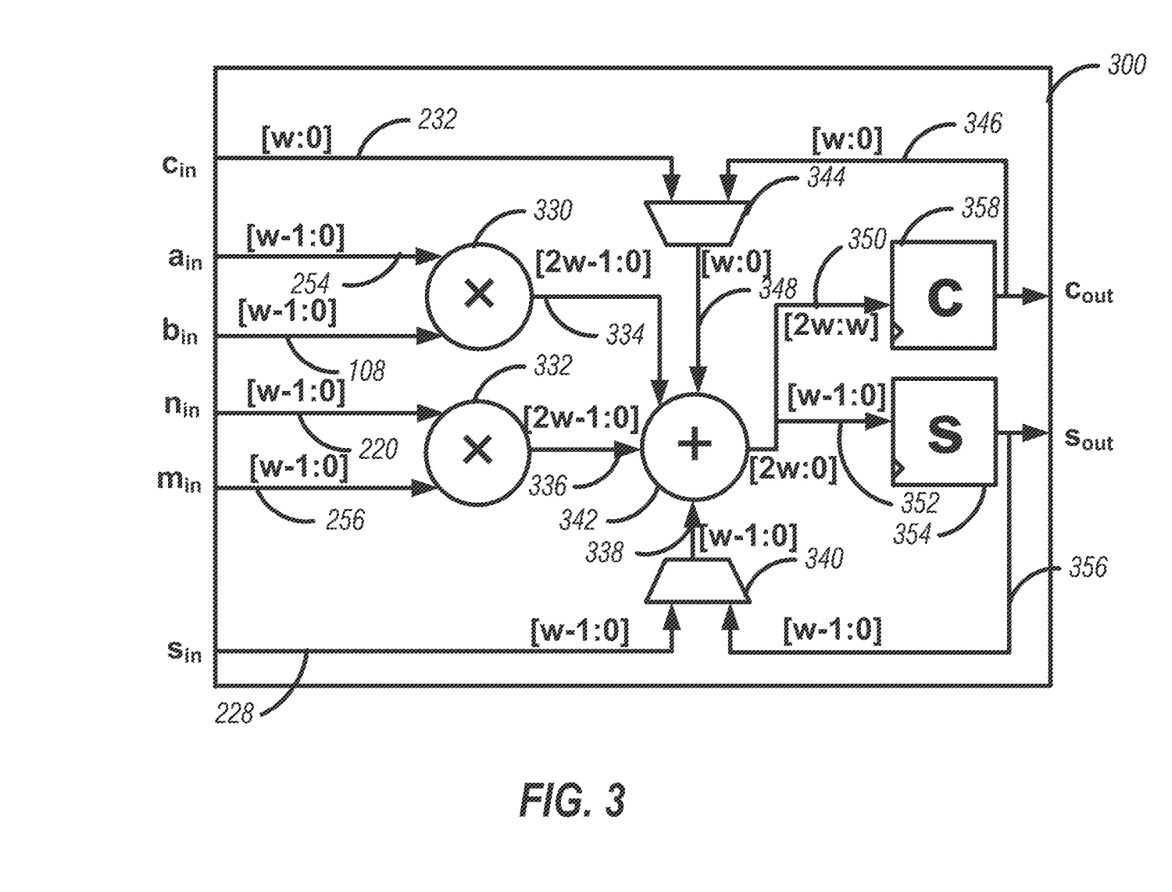
FIG. 3 illustrates, by way of example, a circuit diagram of an embodiment of the final PE.

FIG. 3 illustrates, by way of example, a circuit diagram of an embodiment of the final PE 300. The final PE 300 has a similar architecture as the middle PE 200, with the final PE 300 not including flip flops to propagate $a_{in}$ or $m_{in}$ as the final PE 300 has no further PE to which to propagate them.

The final PE 300 as illustrated receives $c_{in}$ 232, $a_{in}$ 254, $b_{in}$ 108, $n_{in}$ 220, $m_{in}$ 256, and $s_{in}$ 228. $c_{in}$ 232, $m_{in}$ 256, and $a_{in}$ 254 for the final PE 300 are equal to $c_{out}$ 232, $m_{out}$ 256, and $a_{out}$ 254 from the immediately previous middle PE 200. Thus the outputs and inputs that are equal to each other are illustrated as having the same reference number. The inputs to the final PE 300 are results from the immediately previous middle PE 200 or equal to inputs to the initial PE 100, or a combination thereof. Thus, operation of the final PE 300 is not relevant until the inputs to the final PE 300 are valid. This means that at least four clock cycles pass before operation of the final PE 300 is valid. Outputs of the final PE 300 for clock cycles before the inputs are valid can be discarded.

The final PE 300 as illustrated includes inputs $c_{in}$ 232, $m_{in}$ 256, $a_{in}$ 254, $b_{in}$ 108, $n_{in}$ 220, and $s_{in}$ 228. In the example of FIG. 3 each radix has w bits, where w is an integer. The final PE 300 includes circuitry (e.g., multipliers 330, 332 (not modular, but standard multipliers), adder 342 (not modular, but a standard adder), multiplexers 340, 344, and flip flops 358, 354 as well as electrical interconnects therebetween). The circuitry operates on the inputs $c_{in}$ 232, $m_{in}$ 256, $a_{in}$ 254, $b_{in}$ 108, $n_{in}$ 220, and $s_{in}$ 228, to generate outputs $c_{out}$ 346, $s_{out}$ 356. $c_{out}$ 346 is a carry (the most significant bits (MSBs)) of the output that is relevant to determining a next most significant radix of the output. $s_{out}$ 356 is a result of Montgomery multiplication.

In a first valid clock cycle of the final PE 300, the multiplier 330 produces a result 334 that is a product of $a_{in}$ 254 and $b_{in}$ 108. The multiplier 332 produces a result 336 that is a product of $m_{in}$ 256 and $n_{in}$ 220. The results 334, 336 are summed with $c_{in}$ 232 and $s_{in}$ 228 by adder 342 to produce a result. The result is split into MSBs 350 and LSBs 352. The MSBs 350 are propagated to the input of the flip flop 358. The LSBs 352 are propagated to the input of the flip flop 354.

In an immediately next valid clock cycle of the final PE 300, the multiplier 330 produces a result 334 that is a product of $a_{in}$ 254 and $b_{in}$ 108. The multiplier 332 produces a result 336 that is a product of $m_{in}$ 256 and $n_{in}$ 220. The multiplexer 344 is controlled to provide $c_{out}$ 346 on its output 348. The multiplexer 340 is controlled to provide $s_{out}$ 346 on its output 338. The results 334, 336 are summed with $c_{out}$ 346 and $s_{out}$ 356 by adder 342 to produce a result. The result is split into MSBs 350 and LSBs 352. The MSBs 350 are propagated to the input of the flip flop 358. The LSBs 352 are propagated to the input of the flip flop 354. $s_{out}$ 356 from each of the initial valid clock cycles of the final PE 300 are recorded as Montgomery outputs.

Figure 4:
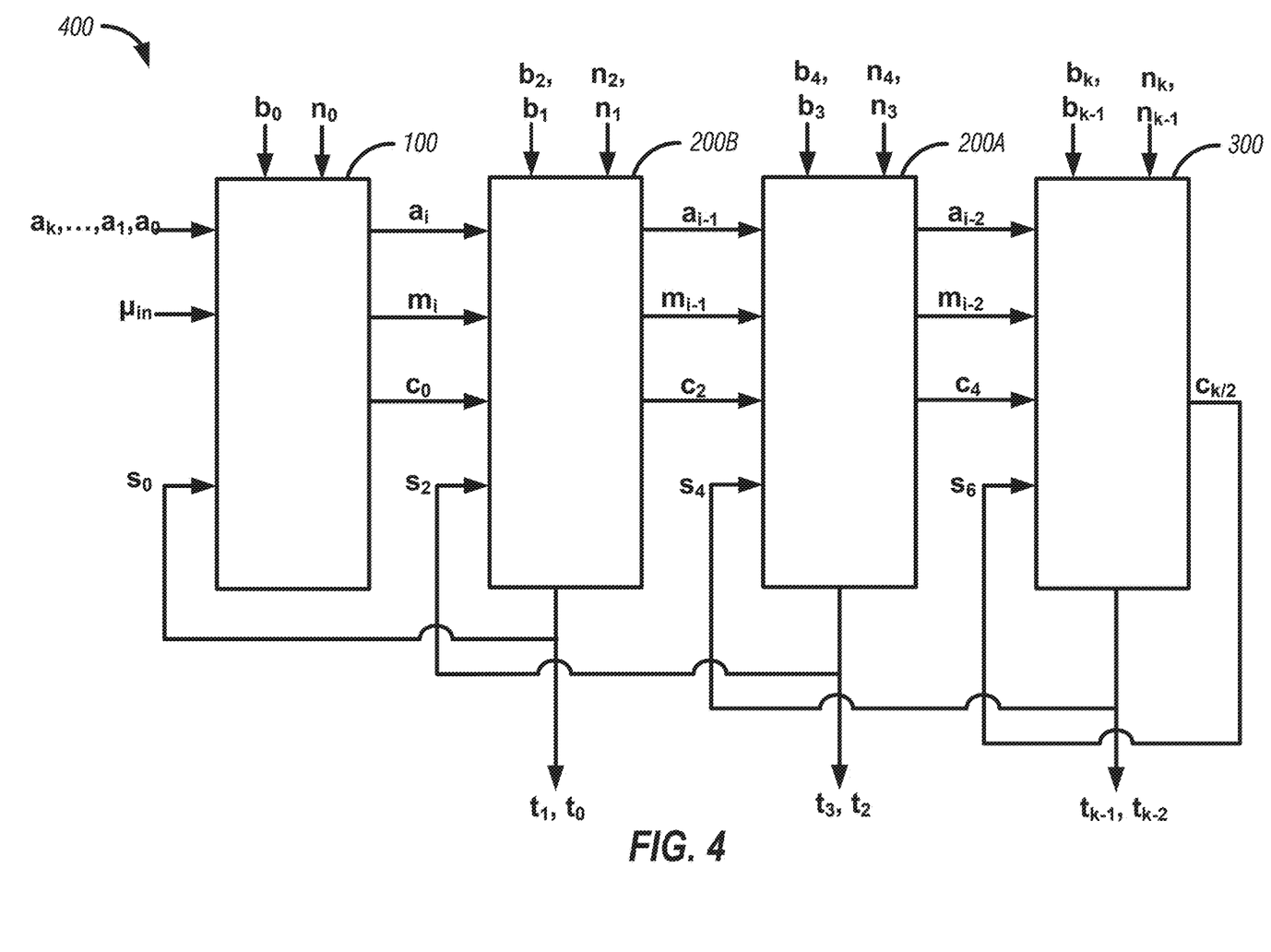
FIG. 4 illustrates, by way of example, a diagram of an embodiment of a system that includes an initial PE, multiple middle PEs, and a final PE 300.

FIG. 4 illustrates, by way of example, a diagram of an embodiment of a system 400 that includes an initial PE 100, multiple middle PEs 200 (denoted as middle PE 200A and 200B), and a final PE 300. The system 400 performs Montgomery multiplication efficiently. The illustration provided in FIG. 4 uses subscripts to denote different radixes. The subscript, i, denotes relative clock cycles. It takes two clock cycles for the initial PE 100 to generate a valid output. Then, after a first clock cycle, the first middle PE 200A operates on output of the initial PE 100. After the second clock cycle, $s_{out}$ 242 (shown as $t_0$) from the middle PE 200A is recorded as LSBs of the result of Montgomery multiplication. Also, after the second clock cycle, the middle PE 200B has valid inputs and can operate to propagate inputs to the flip flops 248, 228, 250, 252. After the third clock cycle, output from the middle PEs 200A, 200B are valid to provide the next two least significant bit LSB radixes of the result (shown as $t_1$ and $t_2$). After the fourth clock cycle, output from the middle PE 200B and the final PE 300 are valid to provide the next two least significant bit LSB radixes of the result (shown as $t_3$ and $t_{k-2}$). After the fifth clock cycle, output from the final PE 300 is valid to provide the next least significant bit LSB radixes of the result (shown as $t_{k-1}$).

Note that the middle PE 200 and the final PE 300 operate on two consecutive clock cycles to provide two consecutive outputs. However, the initial PE 100 operates only a single clock cycle for each two clock cycles of operation by the middle PE 200 and the final PE 300.

The system 400 produces a Montgomery product of input operands with some constraints: Input operands must be less than N, i.e. A<N and B<N. RADIX>2

$$R = 2 \wedge ((\text{ceil}(\$\text{bits}(N)/RADIX) + 1) * RADIX)$$

R>N

The constraints lead to the following results:

$$T = A*B < N*N = N^2 \tag{1}$$

$$\text{result\_internal} = (T+(T*N' \bmod R)*N)/R \tag{2}$$

$$\text{result\_subtracted\_internal} = \text{result\_internal} - N \tag{3}$$

$$\text{result} = (\text{result\_internal} >= N)?\text{result\_subtracted\_internal}:\text{result internal} \tag{4}$$

From (1) and (2) given R>N, and A, B<N: result_internal<(N^2+R*N)/R=N+N^2/R<N+N^2/N=N+N=2*N
From (3) and (4):

result_subtracted_internal<2*N–N=N

So:

result<$N$

The system 400 can extend the input operands with some zero padding to the MSB to fit in a specific RADIX architecture, as follows:

$$S\_NUM = ((FIELD\_SIZE + RADIX - 1)/RADIX) + 1;$$

$$\text{Extended\_FIELD\_SIZE} = S\_NUM * RADIX;$$

Each of the middle PEs 200 and final PE 300 provides two of S_NUM−1 outputs. The number of PEs needed to implement the Montgomery multiplier follows:

$$PE\_UNITS = ((S\_NUM - 1)/2) - 1;$$

PE_UNITS does not include the initial PE, and the final PE is instantiated separately. So, the total number of PEs is equal to PE_UNITS+1 (for INITIAL PE)+1 (FINAL PE)

From a timing point of view, the system 400 requires (3*S_NUM)−1 clock cycles to complete multiplication. For a Montgomery multiplication of 384 bit inputs and a 32 bit radix, S_NUM=((384+32−1)/32)+1 is about 14;

$$\text{Extended\_FIELD\_SIZE} = 14 * 32 = 448;$$

$$PE\_UNITS = ((14 - 1)/2) - 1 = 5.5 \text{ (round up for 6)}.$$

The total number of PEs for such a system is thus 8.

The operation of such a system operates to determine the Montgomery multiplication result in 41 cycles (3*14)−1 for 384 bits and 32 bit radix. Compared to hundreds of cycles for typical architectures. This is a 75% decrease in number of cycles.

The system 400 provides a configurable hardware architecture for a Montgomery multiplier, which can offer more efficiency, such as by parallel computation. The system 400 provides a scalable architecture of a modular multiplier that can be optimized and mapped to different platforms targeting different performance levels.

Figure 5:
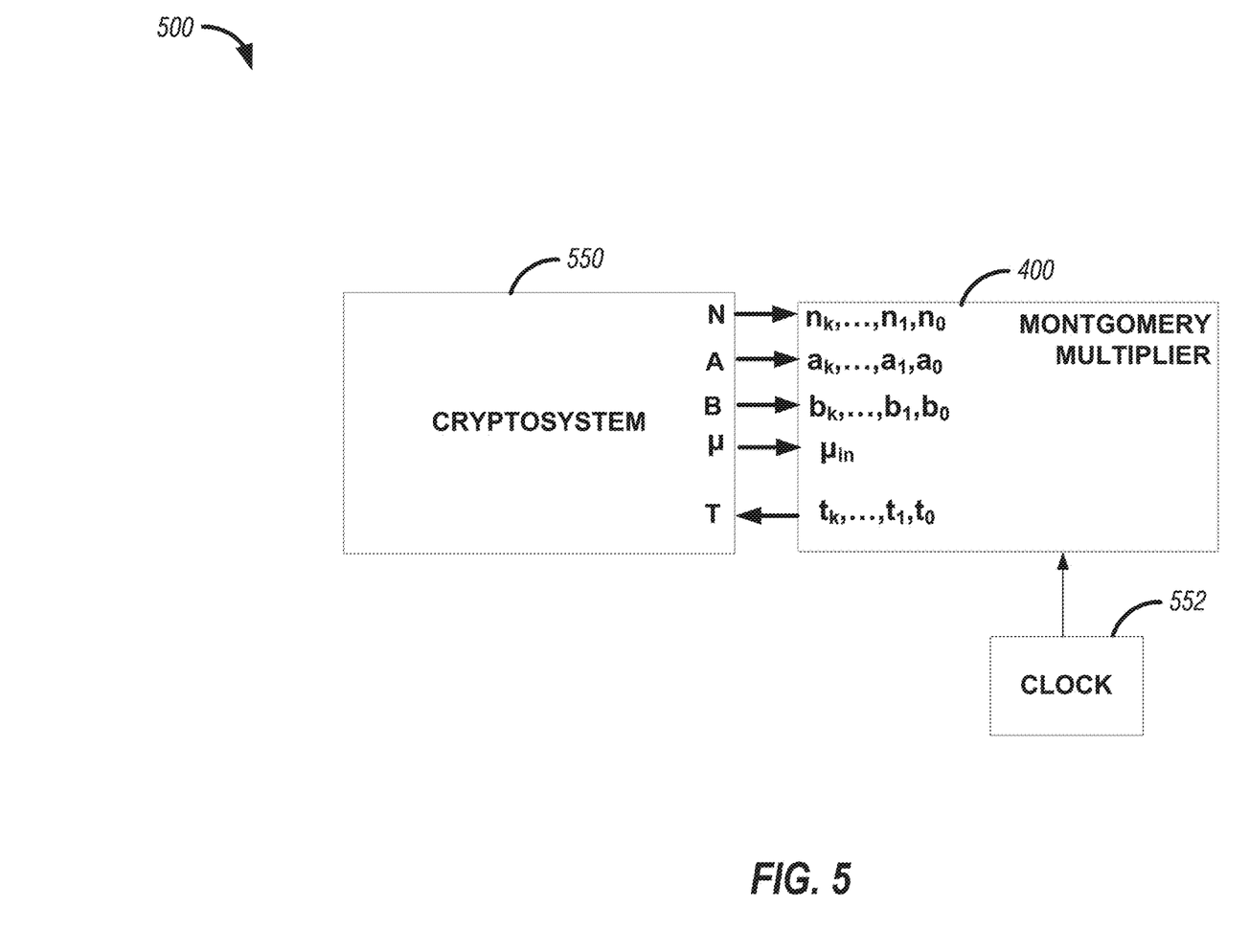
FIG. 5 illustrates, by way of example, a diagram of an embodiment of a system for efficient and configurable Montgomery multiplication.

FIG. 5 illustrates, by way of example, a diagram of an embodiment of a system 500 for efficient and configurable Montgomery multiplication. The system 500 as illustrated includes a cryptosystem 550 that operates using Montgomery multiplication. The cryptosystem 550 can be any hardware, software, or a combination thereof, that uses Montgomery multiplication for operation. Common cryptography techniques that use Montgomery multiplication include ECC, RSA, Diffie-Helman, among others. The Montgomery multiplier 400 receives a request initiated by the cryptosystem 550 for performing Montgomery multiplication of operands A and B modulus N, and a modular inverse of N, μ. The Montgomery multiplier 400 provides a result, T, to the cryptosystem 550. The Montgomery multiplier 400 operates based on a signal from a clock 552. Typically a rising edge of a clock causes the circuitry of the Montgomery multiplier 500 to operate on inputs and propagate new signals to outputs.

Figure 6:
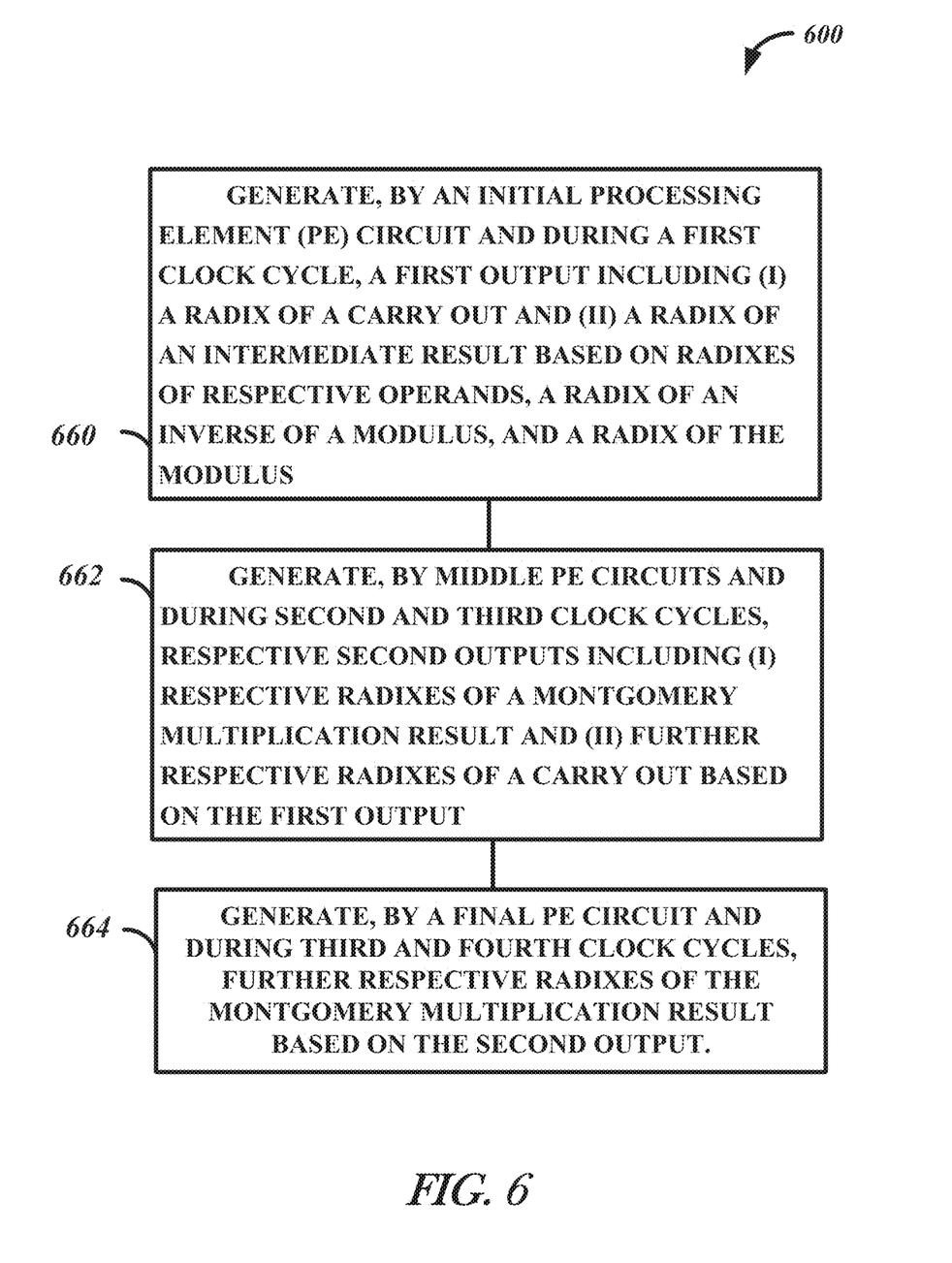
FIG. 6 illustrates, by way of example, a diagram of an embodiment of a method for Montgomery multiplication.

FIG. 6 illustrates, by way of example, a diagram of an embodiment of a method 600 for Montgomery multiplication. The method 600 as illustrated includes generating, by an initial processing element (PE) circuit and during a first clock cycle, a first output including (i) a radix of a carry out and (ii) a radix of an intermediate result based on radixes of respective operands, a radix of an inverse of a modulus, and a radix of the modulus, at operation 660; generating, by middle PE circuits and during second and third clock cycles, respective second outputs including (i) respective radixes of a Montgomery multiplication result and (ii) further respective radixes of a carry out based on the first output, at operation 662; and generating, by a final PE circuit and during third and fourth clock cycles, further respective radixes of the Montgomery multiplication result based on the second output, at operation 664.

Figure 7:
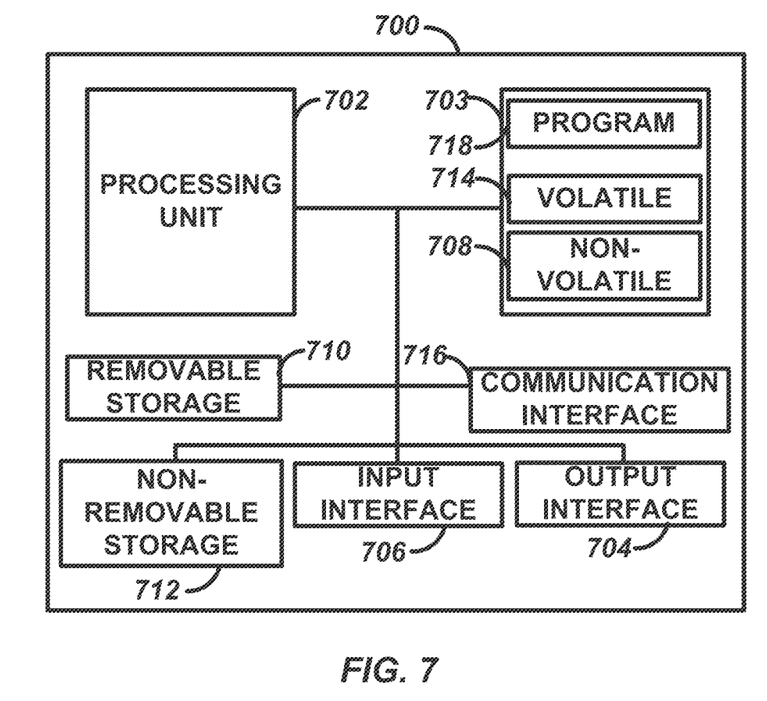
FIG. 7 is a block schematic diagram of a computer system to perform Montgomery multiplication, and for performing methods and algorithms according to example embodiments.

FIG. 7 is a block schematic diagram of a computer system 700 to perform Montgomery multiplication, and for performing methods and algorithms according to example embodiments. Any of the components of the initial PE 100, middle PE 200, final PE 300, operations of the method 600, or other component or operation can be implemented using the system 700 or a component thereof. All components of the system 700 need not be used in various embodiments, such as in FPGA implementation.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

Examples and Additional Notes

Example 1 includes a Montgomery multiplier circuit comprising an initial processing element (PE) circuit configured to, based on inputs from a cryptosystem, generate a first output including (i) a radix of a carry out and (ii) a radix of an intermediate result, the inputs from the cryptosystem including a radix of a first operand, a radix of a second operand, a radix of an inverse of a modulus, and a radix of the modulus, middle PE circuits configured to generate, based on the first output, a second output including (i) respective radixes of a first portion of a Montgomery multiplication result and (ii) further respective radixes of a carry out on two consecutive clock cycles, and a final PE circuit configured to generate, based on the second output, further radixes of a second portion of the Montgomery multiplication result on two consecutive, subsequent clock cycles.

In Example 2, Example 1 further includes, wherein the middle PE circuits further operate based on further radixes of the operands.

In Example 3, at least one of Examples 1-2 further includes, wherein the middle PE circuits are connected in series with each other and the initial PE circuit to operate on output of an immediately prior PE circuit and provide output to the final PE circuit.

In Example 4, at least one of Examples 1-3 further includes, wherein the initial PE circuit operates every other clock cycle.

In Example 5, Example 4 further includes, wherein the middle and final PE circuits operate every clock cycle.

In Example 6, at least one of Examples 1-5 further includes, wherein the initial PE circuit includes a first multiplier configured to receive the radixes of the respective operands and generate a first product thereof, a first adder configured to receive least significant bits (LSBs) of the product and a Montgomery multiplier result from a middle PE circuit of the middle PE circuits and determine a first sum thereof, a second adder configured to receive a most significant bit (MSB) of the sum and MSBs of the product and generate a second sum thereof, and a second multiplier configured to receive the radix of the inverse of the modulus and the second sum and generate the intermediate result that is a second product thereof.

In Example 7, Example 6 further includes, wherein the initial PE circuit further includes a first flip flop configured to receive LSBs of the first sum, a second flip flop configured to receive the second sum, and a third flip flop configured to receive the intermediate result.

In Example 8, Example 7 further includes, wherein the initial PE circuit further includes a third multiplier configured to receive output of the third flip flop and the radix of the modulus and generate a third product thereof, a third adder configured to receive LSBs of the third product and output of the first flip flop and generate a third sum thereof, and a fourth adder configured to receive MSBs of the third product, output of the second flip flop, and an MSB of the third product and generate the radix of the carry out that is a sum thereof.

In Example 9, at least one of Examples 1-8 further includes, wherein each of the middle PE circuits includes a fourth multiplier configured to receive the radixes of the respective operands and determine a fourth product thereof, a fifth multiplier configured to receive the intermediate output and a radix of the modulus and generate a fifth product thereof, and a fifth adder configured to receive the fourth product, the fifth product, the carry out from an immediately previous middle PE circuit of the middle PE circuits or the initial PE circuit, and a Montgomery multiplication result from a downstream middle PE circuit of the middle PE circuits or the final PE circuit and generate a fifth sum thereof.

In Example 10, Example 9 further includes, wherein each of the middle PE circuits further includes a fourth flip flop configured to receive LSBs of the fifth sum, the LSBs of the fifth sum corresponding to a radix of the result of Montgomery multiplication, and a fifth flip flop configured to receive MSBs of the fifth sum, the MSBs of the fifth sum corresponding to a middle carry out of the middle PE circuit.

In Example 11, Example 10 further includes, wherein the middle PE circuits each further include a first multiplexer configured to receive the carry out and the middle carry out from the fifth flip flop as respective inputs, and a second multiplexer configured to receive the Montgomery multiplication result from the downstream middle PE circuit of the middle PE circuits or the final PE circuit and the LSBs of the fifth sum from the fourth flip flop as respective inputs.

In Example 12, Example 11 further includes, wherein the final PE circuit includes a sixth multiplier configured to receive the radixes of the respective operands and determine a sixth product thereof, a seventh multiplier configured to receive the intermediate output and a radix of the modulus and generate a seventh product thereof, and a sixth adder configured to receive the sixth product, the seventh product, the carry out from a last middle PE circuit of the middle PE circuits, and a radix of the result of the Montgomery multiplication from the final PE circuit and generate a sixth sum thereof.

In Example 13, Example 12 further includes, wherein the final PE circuit further includes a sixth flip flop configured to receive LSBs of the sixth sum, the LSBs of the sixth sum corresponding to a radix of the result of the Montgomery multiplication, and a seventh flip flop configured to receive MSBs of the sixth sum, the MSBs of the sixth sum corresponding to a final carry out of the final PE circuit.

In Example 14, Example 13 further includes, wherein the final PE circuit further includes a third multiplexer coupled to the sixth adder, the third multiplexer configured to receive the final carry out and the carry out from a last middle PE circuit of the middle PE circuits as respective inputs, and a fourth multiplexer configured to receive the radix of the result of the Montgomery multiplication from the fifth flip flop and the LSBs of the sixth sum from the sixth flip flop as respective inputs.

Example 15 includes a method comprising generating, based on radixes of respective operands, a radix of an inverse of a modulus, and a radix of the modulus, by an initial processing element (PE) circuit and during a first clock cycle, a first output including (i) a radix of a carry out and (ii) a radix of an intermediate result, generating, based on the first output, by middle PE circuits, and during second and third clock cycles, respective second outputs including (i) respective radixes of a Montgomery multiplication result and (ii) further respective radixes of a carry out based on the first output, and generating, based on the second output, by a final PE circuit, and during third and fourth clock cycles, further respective radixes of the Montgomery multiplication result based on the second output.

In Example 16, Example 15 further includes, wherein the middles PE circuits operate based on the radix of the carry out, the radix of the intermediate result, and the radixes of the operands.

In Example 17, Example 16 further includes, wherein the middle PE circuits are connected in series with each other.

In Example 18, at least one of Examples 15-17 further includes, wherein the initial PE circuit operates every other clock cycle and the middle and final PE circuits operate every clock cycle.

Example 19 includes a system for Montgomery multiplication, the system comprising a clock, a cryptosystem configured to implement a cryptographic algorithm, an initial processing element (PE) circuit configured to, based on inputs from the cryptosystem and during a first clock cycle of the clock, generate a first output including (i) a radix of a carry out and (ii) a radix of an intermediate result, the inputs from the cryptosystem including a radix of a first operand, a radix of a second operand, a radix of an inverse of a modulus, and a radix of the modulus, middle PE circuits configured to generate, during second and third clock cycles of the clock and based on the first output, a second output including (i) respective radixes of a first portion of a Montgomery multiplication result and (ii) further respective radixes of a carry out, the second and third clock cycles immediately after the first clock cycle, and a final PE circuit configured to generate, during fourth and fifth clock cycles of the clock based on the second output, further radixes of a second portion of the Montgomery multiplication result, the fourth and fifth clock cycles immediately after the third clock cycle.

In Example 20, Example 19 further includes, wherein the middle PE circuits include a first middle PE circuit and a last middle PE circuit coupled in series with each other and the initial PE circuit and the final PE circuit, the first middle PE circuit coupled to receive the first output from the initial PE circuit, and the last middle PE circuit coupled to provide the second output to the final PE circuit.

In Example 21, at least one of Examples 19-20 includes at least some of the subject matter of at least one of Examples 1-14.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A Montgomery multiplier circuit comprising:
a single initial processing element (PE) circuit configured to, based on inputs from a cryptosystem, generate a first output including (i) a radix of a carry out and (ii) a radix of an intermediate result, the inputs from the cryptosystem including a radix of a first operand, a radix of a second operand, a radix of an inverse of a modulus, and a radix of the modulus, the initial PE including:
a first multiplier configured to receive the radixes of the respective operands and generate a first product thereof;
a first adder configured to receive least significant bits (LSBs) of the product and a Montgomery multiplier result from a middle PE circuit of the middle PE circuits and determine a first sum thereof;
a second adder configured to receive a most significant bit (MSB) of the sum and MSBs of the product and generate a second sum thereof; and
a second multiplier configured to receive the radix of the inverse of the modulus and the second sum and generate the intermediate result that is a second product thereof;
multiple middle PE circuits connected in series with each other, the middle PE circuits including a first middle PE circuit configured to receive the first output and a last middle PE circuit configured to generate, based on the first output, a second output including (i) respective radixes of a first portion of a Montgomery multiplication result and (ii) further respective radixes of a carry out on two consecutive clock cycles; and
a single final PE circuit configured to receive the second output and generate, based on the second output, further radixes of a second portion of the Montgomery multiplication result on two consecutive, subsequent clock cycles, the initial circuit, middle PE circuits, and final PE circuits including different hardware components and different hardware component configurations.

2. The Montgomery multiplier of claim 1, wherein the middle PE circuits further operate based on further radixes of the operands.

3. The Montgomery multiplier of claim 1, wherein the middle PE circuits are connected in series with each other and the initial PE circuit to operate on output of an immediately prior PE circuit and provide output to the final PE circuit.

4. The Montgomery multiplier of claim 1, wherein the initial PE circuit operates every other clock cycle.

5. The Montgomery multiplier of claim 4, wherein the middle and final PE circuits operate every clock cycle.

6. The Montgomery multiplier of claim 1, wherein the initial PE circuit further includes:
a first flip flop configured to receive LSBs of the first sum;
a second flip flop configured to receive the second sum; and
a third flip flop configured to receive the intermediate result.

7. The Montgomery multiplier of claim 6, wherein the initial PE circuit further includes:
a third multiplier configured to receive output of the third flip flop and the radix of the modulus and generate a third product thereof;
a third adder configured to receive LSBs of the third product and output of the first flip flop and generate a third sum thereof; and
a fourth adder configured to receive MSBs of the third product, output of the second flip flop, and an MSB of the third product and generate the radix of the carry out that is a sum thereof.

8. The Montgomery multiplier of claim 1, wherein each of the middle PE circuits includes:
a fourth multiplier configured to receive the radixes of the respective operands and determine a fourth product thereof;
a fifth multiplier configured to receive the intermediate output and a radix of the modulus and generate a fifth product thereof; and
a fifth adder configured to receive the fourth product, the fifth product, the carry out from an immediately previous middle PE circuit of the middle PE circuits or the initial PE circuit, and a Montgomery multiplication result from a downstream middle PE circuit of the middle PE circuits or the final PE circuit and generate a fifth sum thereof.

9. The Montgomery multiplier of claim 8, wherein each of the middle PE circuits further includes:
a fourth flip flop configured to receive LSBs of the fifth sum, the LSBs of the fifth sum corresponding to a radix of the result of Montgomery multiplication; and
a fifth flip flop configured to receive MSBs of the fifth sum, the MSBs of the fifth sum corresponding to a middle carry out of the middle PE circuit.

10. The Montgomery multiplier of claim 9, wherein the middle PE circuits each further include:
a first multiplexer configured to receive the carry out and the middle carry out from the fifth flip flop as respective inputs; and
a second multiplexer configured to receive the Montgomery multiplication result from the downstream middle PE circuit of the middle PE circuits or the final PE circuit and the LSBs of the fifth sum from the fourth flip flop as respective inputs.

11. The Montgomery multiplier of claim 10, wherein the final PE circuit includes:
a sixth multiplier configured to receive the radixes of the respective operands and determine a sixth product thereof;
a seventh multiplier configured to receive the intermediate output and a radix of the modulus and generate a seventh product thereof; and
a sixth adder configured to receive the sixth product, the seventh product, the carry out from a last middle PE circuit of the middle PE circuits, and a radix of the result of the Montgomery multiplication from the final PE circuit and generate a sixth sum thereof.

12. The Montgomery multiplier of claim 11, wherein the final PE circuit further includes:
a sixth flip flop configured to receive LSBs of the sixth sum, the LSBs of the sixth sum corresponding to a radix of the result of the Montgomery multiplication; and
a seventh flip flop configured to receive MSBs of the sixth sum, the MSBs of the sixth sum corresponding to a final carry out of the final PE circuit.

13. The Montgomery multiplier of claim 12, wherein the final PE circuit further includes:
a third multiplexer coupled to the sixth adder, the third multiplexer configured to receive the final carry out and the carry out from a last middle PE circuit of the middle PE circuits as respective inputs; and
a fourth multiplexer configured to receive the radix of the result of the Montgomery multiplication from the fifth flip flop and the LSBs of the sixth sum from the sixth flip flop as respective inputs.

14. A method comprising:
generating, based on radixes of respective operands, a radix of an inverse of a modulus, and a radix of the modulus, by an initial processing element (PE) circuit and during a first clock cycle, a first output including (i) a radix of a carry out and (ii) a radix of an intermediate result, the initial PE generates the output by:
a first multiplier that receives the radixes of the respective operands and generate a first product thereof;
a first adder configured to receive least significant bits (LSBs) of the product and a Montgomery multiplier result from a middle PE circuit of the middle PE circuits and determine a first sum thereof;
a second adder configured to receive a most significant bit (MSB) of the sum and MSBs of the product and generate a second sum thereof; and
a second multiplier configured to receive the radix of the inverse of the modulus and the second sum and generate the intermediate result that is a second product thereof;
generating, based on the first output, by middle PE circuits, and during second and third clock cycles, respective second outputs including (i) respective radixes of a Montgomery multiplication result and (ii) further respective radixes of a carry out based on the first output; and
generating, based on the second output, by a final PE circuit, and during third and fourth clock cycles, further respective radixes of the Montgomery multiplication result based on the second output.

15. The method of claim 14, wherein the middle PE circuits operate based on the radix of the carry out, the radix of the intermediate result, and the radixes of the operands.

16. The method of claim 14, wherein the middle PE circuits are connected in series with each other.

17. The method of claim 14, wherein the initial PE circuit operates every other clock cycle and the middle and final PE circuits operate every clock cycle.

18. A system for Montgomery multiplication, the system comprising:

a clock;

a cryptosystem configured to implement a cryptographic algorithm;

an initial processing element (PE) circuit configured to, based on inputs from the cryptosystem and during a first clock cycle of the clock, generate a first output including (i) a radix of a carry out and (ii) a radix of an intermediate result, the inputs from the cryptosystem including a radix of a first operand, a radix of a second operand, a radix of an inverse of a modulus, and a radix of the modulus, the initial PE including:

a first multiplier configured to receive the radixes of the respective operands and generate a first product thereof;

a first adder configured to receive least significant bits (LSBs) of the product and a Montgomery multiplier result from a middle PE circuit of the middle PE circuits and determine a first sum thereof;

a second adder configured to receive a most significant bit (MSB) of the sum and MSBs of the product and generate a second sum thereof; and a second multiplier configured to receive the radix of the inverse of the modulus and the second sum and generate the intermediate result that is a second product thereof;

middle PE circuits configured to generate, during second and third clock cycles of the clock and based on the first output, a second output including (i) respective radixes of a first portion of a Montgomery multiplication result and (ii) further respective radixes of a carry out, the second and third clock cycles immediately after the first clock cycle; and a final PE circuit configured to generate, during fourth and fifth clock cycles of the clock based on the second output, further radixes of a second portion of the Montgomery multiplication result, the fourth and fifth clock cycles immediately after the third clock cycle.

19. The system of claim 18, wherein:

the middle PE circuits include a first middle PE circuit and a last middle PE circuit coupled in series with each other and the initial PE circuit and the final PE circuit;

the first middle PE circuit coupled to receive the first output from the initial PE circuit; and the last middle PE circuit coupled to provide the second output to the final PE circuit.

* * * * *